Patented Aug. 16, 1938

2,127,484

UNITED STATES PATENT OFFICE 2,127,484

THIOINDOXYL DERIVATIVE AND PROCESS OF MAKING THE SAME

Emeric Havas, Pitman, N. J., assignor to E. I. du Pont de Nemours & Company, Wilmington, Del., a corporation of Delaware No Drawing. Application October 30, 1936, Serial No. 108,365

2 Claims. (Cl. 260—330)

This invention relates to a novel organic compound and includes a process of making the same.

It is an object of this invention to provide a novel compound of the thioindoxyl series which is characterized by useful properties adapting it for use in the art of dyeing cellulose acetate and related materials. It is a further object of this invention to provide a process for manufacturing said novel compound. Other and further objects of this invention will appear as the description proceeds.

I have found that the compound of the formula

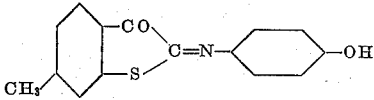

possesses great affinity for cellulose acetate material, and when dyed thereon produces a bright yellow shade of excellent fastness properties. The dyeing may follow any of the standard procedures known in the art for dyeing cellulose acetate material; see for instance my copending application, Serial No. 108,363, filed on same date herewith and issued October 5, 1937, as U. S. Patent No. 2,094,597. The said compound also possesses other valuable characteristics which may adapt it for use in other arts.

The said novel compound of my invention may be synthesized by condensing 6-methyl-thioindoxyl with para-nitroso-phenol in alkaline, aqueous alcoholic medium. The reaction most probably proceeds according to the following equation:

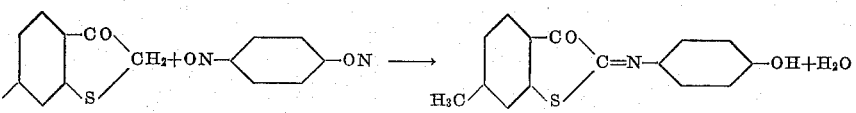

Without limiting my invention to any particular procedure, the following example will serve to illustrate my preferred mode of operation:

22 parts of 6-methyl-thioindoxyl (M. P. 84° C., German Patent 204,763), were dissolved in 100 parts of ethyl alcohol. 88 parts of caustic soda of 30% strength and 110 parts of water were added at 50° C. 20 parts of p-nitrosophenol solution (86% strength) were added, and the mass was stirred at 40–50° C. for 1 hour. The mass was then diluted with 300 parts of water. 100 parts of salt were added; and the mass was further stirred for 1 hour. The precipitated product was removed by filtration and washed with 20% salt solution.

The product thus obtained was dissolved in 1000 parts of water and 5 parts of 30% caustic soda solution at 80° C., and the solution was filtered to remove insoluble impurities. The filtrate was acidified with acetic acid. The product obtained was filtered, washed with cold water and dried.

12 parts of a yellow solid were obtained, melting at 210° C.

It will be understood that my invention is susceptible of wide variation and modification within the skill of those versed in this art.

I claim:

1. The compound of the formula

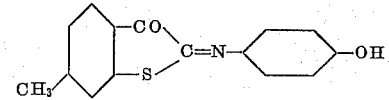

said compound being a yellow solid melting at 210° C. and being characterized by dyeing cellulose acetate material in a bright yellow shade of good fastness properties.

2. The process which comprises condensing 6-methy-thioindoxyl with p-nitroso-phenol in alkaline, aqueous alcoholic medium, and recovering the resulting compound.

EMERIC HAVAS.